Patented Nov. 21, 1944

2,362,973

UNITED STATES PATENT OFFICE 2,362,973

NONCRYSTALLIZING ROSIN SIZE AND
METHOD OF MAKING THE SAME

Jack T. Cassaday, Stamford, Conn., assignor to American Cyanamid Company, New York, N. Y., a corporation of Maine No Drawing. Application January 22, 1942, Serial No. 427,701

6 Claims. (Cl. 106—238)

This invention relates to rosin size compositions stabilized against crystallization and to methods of preparing the same. More specifically, the invention deals with the problem of inhibiting crystallization in liquid rosin size of the type prepared by saponifying rosin with solutions of alkalies such as sodium carbonate.

The problem of crystal formation in liquid rosin size solutions is extremely troublesome in the commercial utilization of the material. Although such crystallization sometimes occurs during the manufacture or shipment of liquid rosin size, it is most usually encountered in the large storage tanks used by paper mills for maintaining a supply of size solution adequate for continuous operations. New supplies of size solution are usually received in drums or tank cars and are transferred to these storage tanks where the size may be stored for some time before it is used. Crystallization occurring in these storage tanks not only causes a serious loss of size, but the crystals plug up pipe lines and are highly objectionable.

Although rosin sizes prepared from various types of rosin, including both gum rosin and wood rosin, have been known to crystallize, the most serious difficulties have been encountered with sizes prepared by saponifying wood rosin with sodium carbonate solutions. Analysis of the crystals obtained from both wood rosin and gum rosin sizes shows that they consist of a double salt of abietic acid and sodium abietate having the approximate composition of 3 moles of abietic acid for 1 mole of sodium abietate. It is a principal object of my present invention to obtain a liquid rosin size in which the formation of these double-salt crystals is substantially prevented by the addition of a suitable crystallization inhibitor to the rosin size composition. A more specific object resides in the modification of the rosin from which the rosin size is prepared, by the reaction of elemental sulfur therewith, so that upon subsequent saponification with alkalies the resulting size will have a retarded rate of crystallization.

I have found that crystallization in rosin sizes is inhibited or greatly retarded by first dissolving relatively small quantities of sulfur in the rosin from which the size is prepared. When either wood rosin or gum rosin is melted and maintained at temperatures of 140° C. or higher and small quantities of preferably finely divided sulfur are added thereto with stirring the sulfur soon dissolves in the rosin, and I have discovered that this pretreatment will reduce the tendency of the saponified rosin to crystallize and in many cases completely overcome the commercial difficulties due to crystallization. Since the pretreatment with sulfur does not alter either the color or the efficiency of rosin sizes prepared from the sulfur treated rosin, it is apparent that my discovery constitutes a cheap but extremely effective method of overcoming the crystallization difficulties outlined above.

On the basis of the results obtained it appears that the product produced by dissolving small amounts of sulfur on the order of 0.25-4% in molten rosin at elevated temperatures is a chemically modified rosin, rather than a mere solution of the sulfur in the rosin. This is shown by the fact that the optical rotation of the rosin is considerably reduced by the reaction of these small amounts of sulfur therewith, and also by the fact that the sulfur-treated rosin can be dissolved in solvent naphtha to form a clear solution without separating sulfur therefrom. However, since the present invention is not primarily dependent upon the existence of a chemical reaction between the rosin and the sulfur, the term "dissolving" is used in the present specification to describe the action of finely divided sulfur on molten rosin at elevated temperatures, irrespective of whether a chemical reaction takes place or not.

The quantity of sulfur to be used in practicing my invention is dependent upon the type of rosin employed. As a rule less sulfur is needed to obtain a stabilized rosin size prepared from gum rosin than to stabilize one prepared from wood rosin, for in general the gum rosin sizes are less likely to crystallize upon storage than are the wood rosin sizes. The most important factor controlling the amount of sulfur to be used, however, is the optical rotation of the rosin, for size solutions prepared from rosins having a low optical rotation crystallize much more readily than those from rosins of higher rotation and require much more sulfur to obtain the same degree of protection. From this aspect the effect of the sulfur treatment on the stability of the final rosin size is really surprising, for the reaction with sulfur always reduces the optical rotation of the rosin and one would expect that sizes prepared from the sulfur-treated rosin would crystallize more rapidly than those from the untreated rosin, instead of the opposite.

In general it may be stated that 0.5% of finely divided sulfur, based on the weight of the rosin, should be used in order to obtain adequate protection in sizes prepared from rosins having a high rotation on the order of +15, whereas 2% or more of sulfur may be necessary to obtain the same degree of protection with sizes prepared from rosins of extremely low rotation on the order of −2.5. 0.25% of sulfur may be used with rosins of exceptionally high rotation and 3% may be used with those of unusually low rotation. Amounts much larger than 3% do not appear to give a corresponding increase in protection against crystallization, although moderate amounts will do no serious harm, and the preferred range of sulfur to be used in practicing the invention is therefore about 0.25–3% by weight.

In preparing the new stabilized rosin sizes constituting the subject matter of my present invention the rosin is preferably melted and maintained at temperatures of 140–200° C. or higher while the requisite amount of sulfur in finely divided form is added with stirring. Ground sulfur or flowers of sulfur may be used for this purpose. After the sulfur has been added the stirring is preferably continued for about ten minutes or until the sulfur has completely dissolved, after which sodium carbonate, caustic soda or other suitable alkali may be added in the usual manner for the formation of the rosin size. Effective stabilization against crystallization has also been obtained by adding the sulfur during the cook; that is, by incorporating the finely divided sulfur during the period when the molten rosin and the alkali are being heated together to complete the saponification to the desired extent. Apparently finely divided sulfur will dissolve or react in molten rosin quite easily and rapidly, and my invention therefore includes any process wherein the sulfur is dissolved in the rosin at any stage before or during the rosin size manufacture.

In the copending application of Chester G. Landes and Jack T. Cassaday, Serial No. 369,810, filed December 12, 1940 (now Patent 2,309,346 granted Jan. 26, 1943) it is demonstrated that liquid rosin sizes containing substantial quantities of rosin soap can be stabilized against crystallization by the addition of formaldehyde or water-soluble formaldehyde condensation products thereto. Formaldehyde and its water-soluble condensation products can be used in conjunction with the sulfur-stabilized rosin sizes which constitute the principal subject matter of the present invention, and an even greater protection against crystallization is obtained thereby. It should be understood, therefore, that the addition of small quantities on the order of 1–2% of 37% formaldehyde solution, hexamethylene tetramine, aqueous formaldehyde solutions containing up to 6% hexamethylol melamine, urea-formaldehyde condensation products and di(sulfo-naphthyl) methane or mixtures of any two or more of these to rosin sizes prepared from rosin pretreated with small quantities of sulfur is also included within the scope of the present invention.

The invention will be illustrated in greater detail by the following specific example to which, however, it is not limited.

*Example*

800 parts by weight of wood rosin are heated in an open vessel, the rate of heating being such that the entire mass is molten in about one-half hour. The temperature of the molten mass is then adjusted to a desired figure, the most advantageous range being about 140–200° C. or higher and preferably about 150° C., and finely divided sulfur is added. Heating is then continued with stirring at about the same temperature until the sulfur is completely dissolved in the rosin. The quantity of sulfur to be used for optimum results is a function of the optical rotation of the rosin, as has been explained.

It is unnecessary to continue heating of the molten rosin after the sulfur has been dissolved. The sulfur usually disappears completely after heating for about 10 minutes, and samples heated for 30 minutes and 60 minutes gave no better results than those heated for only 10 minutes. The addition of up to 3% of sulfur in this manner does not alter the color of sizes prepared from the treated rosin.

Rosin size is ordinarily prepared by reacting molten rosin with 9–15% of its weight of sodium carbonate. When about 9% of the sodium carbonate is used the product contains considerable unsaponified rosin and is called a high free-rosin size; when larger quantities on the order of 13–15% are reacted the product is a low free-rosin size. The actual procedure used in preparing the rosin sizes and the method of evaluation was as follows:

500 parts by weight of the sulfur-treated rosin was weighed into a stainless steel reaction vessel. 9–13% of sodium carbonate, based on the weight of the rosin, was dissolved in 215 parts by volume of distilled water and the solution was heated to boiling. The rosin was then heated to 190–212° F. and maintained within this temperature range while the boiling soda ash solution was added. Heating was then continued for about 6 hours at 190–212° F., during which time additions of 50 parts by volume of hot water were made at half-hour intervals until a total of 300 parts had been added. During the heating and water addition the solution in the reaction vessel usually became clear and homogeneous after about 1½ hours.

Samples of the liquid rosin size were tested for crystallization by incubation at 70° C. for long periods of time. Incubation was continued until crystallization had taken place or until enough time had elapsed to establish the fact that the amount of sulfur used was effective to prevent crystallization. In practically all cases it was found that this method was quite reliable, and that if the size was substantially free from crystals after heating at 70° C. for a period of about 10 days it would usually be free from excessive crystallization when stored under commercial conditions.

The following table lists the results obtained with sizes prepared from rosins of both high and low optical rotation, using varying amounts of sulfur and varying temperatures for solution of the sulfur in the rosin. In some cases formaldehyde was added to the finished rosin size, as described and claimed in the copending application referred to above.

| Original rotation | Temp., °C. | Per cent sulfur | Final rotation | Time of crystallization, days | |
|---|---|---|---|---|---|
| | | | | First crystal | Rate of growth |
| +9.5 | 200 | 2 | +10 | 23 | |
| +9.5 | 200 | 1 | +11 | 24 | |
| +9.5 | 175 | 2 | ---- | ---- | None in 40. |
| +9.5 | 160 | 2 | +1 | ---- | None in 40. |
| +9.5 | 150 | 1.5 | +3 | 22 | |
| +9.5 | 150 | 2 | +2 | ---- | None in 40. |
| +9.5 | 140 | 2 | +3 | ---- | None at end of test. |
| +9.5 | 140 | 1.5 | +4 | 22 | |
| -2.5 | 160 | 2 | -8 | ---- | None in 24. |
| -2.5 | 150 | None | -5 | 1 | 90% in 2. |
| +9.5 | 150 | 1 | ---- | 9 | |
| +9.5 | 150 | 0.25 | ---- | 1 | 30-50% in 6. |
| +9.5 | 150 | 0.50 | ---- | 4 | 10-30% in 6. |
| +9.5 | 150 | 0.75 | +9 | 6 | |
| +9.5 | 150 | 1.0 | +8 | 10 | |
| +6.4 | 150 | 1.5 | +4 | 15 | |
| +3.0 | 150 | 1.5 | 0.0 | 3-4 | |
| +6.2 | 150 | 1.0 | ---- | 7 | |
| +9.5 | 150 | 1+0.5 CH$^2$O | ---- | 15 | |
| +9.5 | 150 | 0.5+0.25 CH$^2$O | ---- | 10 | 10-30% in 18. |
| +15 | 150 | 0.25 | +12 | 7 | |
| +15 | 150 | 0.5 | +12 | 11 | |
| +15 | 150 | 0.75 | +15 | 13 | |
| +15 | 150 | 1.0 | ---- | 14 | |

What I claim is:

1. A method of preparing a rosin size composition stabilized against crystallization which comprises saponifying rosin having about 0.25-3% of sulfur dissolved therein, by heating it with an aqueous solution of a soap-forming alkali.

2. A method of preparing a rosin size composition stabilized against crystallization which comprises dissolving 0.25 to 3% of sulfur in molten rosin and saponifying the rosin by heating it with an aqueous solution of a soap-forming alkali.

3. An aqueous liquid rosin size composition resistant to crystallization upon storage and containing an alkali metal soap of a rosin having dissolved therein 0.25 to 3% of its weight of sulfur.

4. An aqueous liquid rosin size composition resistant to crystallization upon storage and containing a sodium soap of a rosin having dissolved therein with 0.25 to 3% of its weight of sulfur.

5. An aqueous liquid rosin size composition resistant to crystallization upon storage and containing substantial quantities of an alkali metal soap of rosin having a small amount of sulfur dissolved therein together with about 1-2% of a member of the group consisting of formaldehyde and water-soluble formaldehyde condensation products.

6. An aqueous liquid rosin size composition resistant to crystallization upon storage and containing an alkali metal soap of a rosin having dissolved therein 0.25 to 3% of its weight of sulfur together with about 1-2% of a member of the group consisting of formaldehyde and water-soluble formaldehyde condensation products.

JACK T. CASSADAY.